(12) United States Patent
Ringlien

(10) Patent No.: US 7,385,174 B2
(45) Date of Patent: Jun. 10, 2008

(54) APPARATUS AND METHOD FOR MEASURING SIDEWALL THICKNESS OF NON-ROUND TRANSPARENT CONTAINERS

(75) Inventor: James A. Ringlien, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 11/474,589

(22) Filed: Jun. 26, 2006

(65) Prior Publication Data
US 2007/0295922 A1    Dec. 27, 2007

(51) Int. Cl.
B07C 5/12 (2006.01)
B07C 5/34 (2006.01)
G01N 21/90 (2006.01)

(52) U.S. Cl. .......................... 250/223 B; 250/223 R; 250/559.28; 356/630; 356/632; 356/239.1; 356/239.4; 209/524; 209/526

(58) Field of Classification Search ............ 250/223 B, 250/223 R, 559.28; 356/630, 632, 239.4, 356/239.1; 209/524, 526
See application file for complete search history.

(56) References Cited

U.S. PATENT DOCUMENTS

| 3,556,279 | A |  | 1/1971 | Cotter |
| 4,124,112 | A |  | 11/1978 | Mohney et al. |
| 4,146,134 | A |  | 3/1979 | Keen et al. |
| 4,500,203 | A | * | 2/1985 | Bieringer ................. 356/239.4 |
| 5,291,271 | A | * | 3/1994 | Juvinall et al. ............. 356/632 |
| 5,917,328 | A |  | 6/1999 | Dimmick et al. |
| 6,199,679 | B1 |  | 3/2001 | Heuft |
| 6,424,414 | B1 |  | 7/2002 | Weiland et al. |
| 6,549,292 | B1 | * | 4/2003 | Schmidt et al. ............. 356/630 |
| 6,557,695 | B2 |  | 5/2003 | Gerber et al. |
| 6,806,459 | B1 | * | 10/2004 | Ringlien et al. ........ 250/223 B |
| 6,975,410 | B1 | * | 12/2005 | Sturgill ....................... 356/631 |
| 2006/0098191 | A1 | * | 5/2006 | Ringlien ................. 356/239.4 |

FOREIGN PATENT DOCUMENTS

FR    2544856 A    10/1984

* cited by examiner

Primary Examiner—Georgia Y. Epps
Assistant Examiner—Seung C. Sohn

(57) ABSTRACT

An apparatus for inspecting sidewall thickness of non-round transparent containers includes a conveyor for holding a container in stationary position and rotating the container around an axis. A light source directs light energy onto a sidewall of the container on the conveyor. An anamorphic lens system having a lens system axis directs onto a light sensor energy reflected from portions of the inside and outside surfaces of the container sidewall that are substantially parallel to the lens system axis. An information processor is responsive to the sensor for determining sidewall thickness at increments of container rotation as a function of separation at the sensor between light energies reflected from the inside and outside surfaces of the container sidewall.

3 Claims, 4 Drawing Sheets

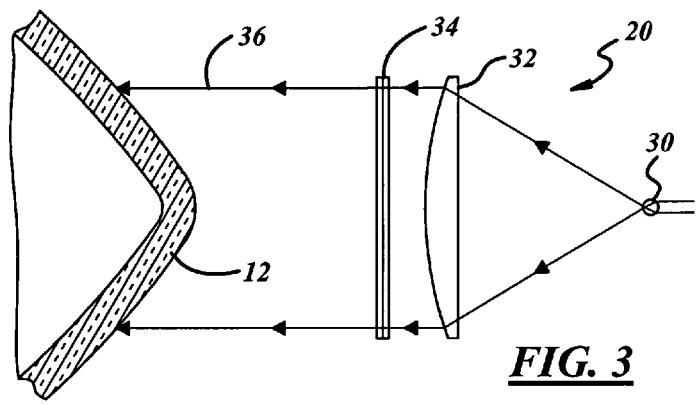
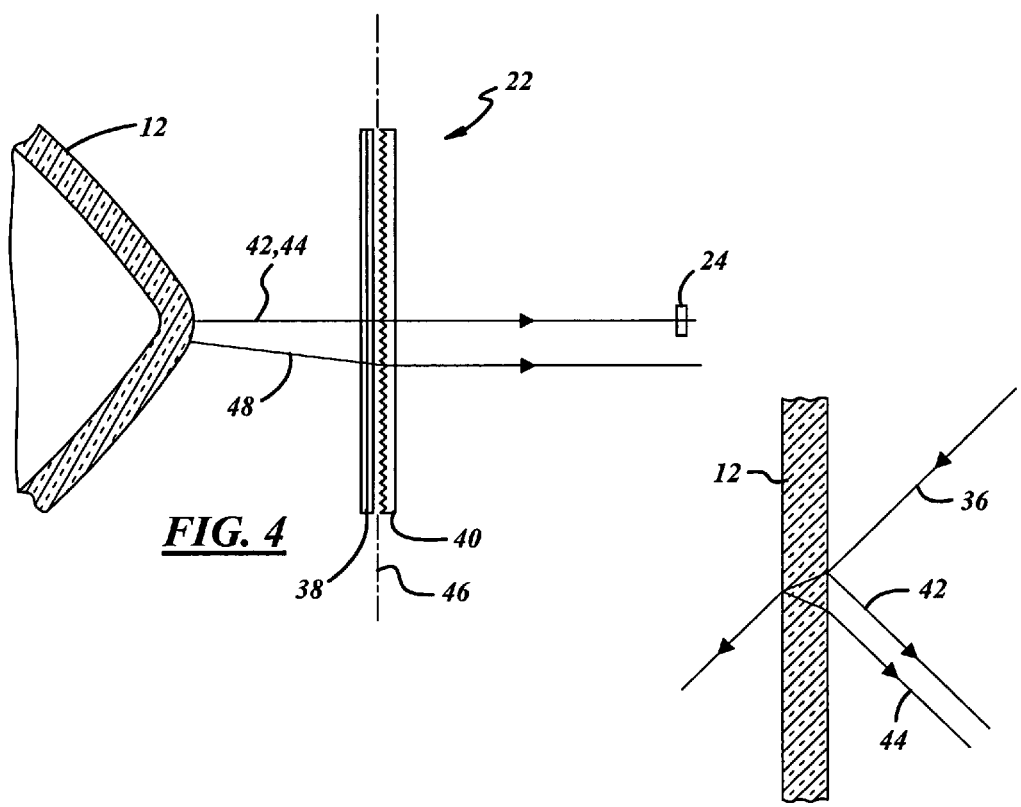

APPARATUS AND METHOD FOR MEASURING SIDEWALL THICKNESS OF NON-ROUND TRANSPARENT CONTAINERS

The present disclosure is directed to inspection of transparent containers for commercial variations that affect optical properties of the containers, and more particularly to an apparatus and method for electro-optically measuring sidewall thickness of non-round transparent containers.

BACKGROUND AND SUMMARY OF THE DISCLOSURE

Electro-optical techniques have been employed for measuring sidewall thickness of transparent containers. For example, U.S. Pat. No. 6,806,459 discloses an apparatus and method for measuring sidewall thickness of a container, which includes a conveyor for moving the container transversely of its axis through an inspection station while simultaneously rotating the container around its axis by "rolling" the container along a rail at the inspection station. A light source and an illumination lens system direct onto the sidewall of the container a line-shaped light beam having a long dimension perpendicular to the axis of the container, parallel to the direction of movement through the inspection station and of sufficient length to illuminate the container sidewall as it is rolled along the rail at the inspection station. An anamorphic imaging lens system directs onto a light sensor light energy reflected from portions of the outside and inside sidewall surfaces that are perpendicular to the illumination light energy. An information processor is responsive to light energy directed onto the light sensor by the imaging lens system for determining the thickness of the container between the outside and inside sidewall surfaces as the container is rolled along the rail. Although the apparatus and method disclosed in the noted patent are well suited for measuring sidewall thickness of round containers, such apparatus and method are not well suited for measuring sidewall thickness of non-round containers that cannot be made to roll along the rail at the inspection station.

U.S. Pat. No. 5,291,271 discloses an apparatus and method for electro-optically measuring the thickness of a container wall. A light source directs a light beam onto the outside surface of the container at an angle such that a portion of the light beam is reflected from the outside surface, and a portion is refracted into the container wall, reflected from the inside wall surface and then re-emerges from the outside wall surface. A lens system is disposed between a light sensor and the container wall for focusing onto the sensor light energy reflected from the outside and inside wall surfaces. The lens system has an image plane in which the sensor is disposed and an object plane collinear with the illumination light beam. The container is held in stationary position and rotated around its axis. An information processor scans the sensor at increments of container rotation, and determines wall thickness of the container between the inside and outside surfaces as a function of the separation between the points of incidence of the reflected light energies on the sensor. Although the apparatus and method disclosed in this patent again is well suited for measuring sidewall thickness of round containers, such apparatus and method are not well suited for measuring sidewall thickness of non-round containers inasmuch as the illumination beam cannot track undulations in the sidewall of a non-round container as the container rotates. It is a general object of the present disclosure to provide an apparatus and method for measuring sidewall thickness of non-round transparent containers.

The present disclosure embodies a number of aspects that can be implemented separately from or in combination with each other.

An apparatus for inspecting sidewall thickness of non-round transparent containers, in accordance with one aspect of the present disclosure, includes a conveyor for holding a container in stationary position and rotating the container around an axis. A light source directs light energy onto a sidewall of the container on the conveyor. An anamorphic lens system having a lens system axis directs onto a light sensor energy reflected from portions of the inside and outside surfaces of the container sidewall that are substantially parallel to the lens system axis. The term "substantially parallel" means that the surfaces of the container sidewall are parallel to the lens system axis within a narrow acceptance angle of the lens system, such as an acceptance angle of 1° in an exemplary embodiment of the disclosure. An information processor is responsive to the sensor for determining sidewall thickness at increments of container rotation as a function of separation at the sensor between light energies reflected from the inside and outside surfaces of the container sidewall.

An apparatus for inspecting sidewall thickness of non-round transparent containers, in accordance with another aspect of the present disclosure, includes a conveyor for presenting containers in sequence and holding each container in turn in stationary position while rotating the container around an axis. A light source directs light energy onto a sidewall of a container as it is held and rotated on the conveyor. An anamorphic lens system having a lens system axis directs onto a light sensor portions of the light energy reflected from inside and outside surfaces of the container sidewall in planes substantially perpendicular to the lens system axis. The term "substantially perpendicular" refers to light energy reflected in planes perpendicular to the lens system axis within a narrow acceptance angle of the lens system, such as 1° in an exemplary embodiment of the disclosure. The light energy portions reflected from inside and outside surfaces of the container sidewall in planes substantially perpendicular to the lens system axis sweep back and forth along the anamorphic lens system, as the container rotates, due to the non-roundness of the container. An information processor is responsive to the light sensor for determining sidewall thickness at increments of container rotation as a function of separation at the sensor between light energy portions reflected from the inside and outside surfaces of the container sidewall.

A method of inspecting sidewall thickness of a non-round container, in accordance with a further aspect of the present disclosure, includes holding the container in stationary position while rotating the container around an axis. A line-shaped light beam is directed onto a sidewall of the container, with the line-shaped light beam having a long dimension perpendicular to the axis of rotation. Portions of the light beam reflected from inside and outside surfaces of the container sidewall that are substantially perpendicular to light energy directed onto the container sidewall, as viewed from a direction parallel to the axis, are directed onto a light sensor. Container sidewall thickness is determined at increments of container rotation as a function of separation at the sensor between light energy portions reflected from the inside and outside surfaces of the container sidewall.

BRIEF DESCRIPTION OF THE DRAWINGS

The disclosure, together with additional objects, features, advantages and aspects thereof, will best be understood from the following description, the appended claims and the accompanying drawings, in which:

FIG. 3 is a top plan view of the illumination lens system of FIG. 2, being taken from the direction 3 in FIG. 2;

FIG. 4 is a top plan view of the imaging lens system in the exemplary embodiment of FIG. 2, being taken from the direction 4 in FIG. 2;

FIG. 5 is a schematic illustration of reflections and refractions of light energy at the container sidewall, being an enlargement of the portion of FIG. 2 within the area 5.

DETAILED DESCRIPTION OF PREFERRED EMBODIMENTS

Figure 1:
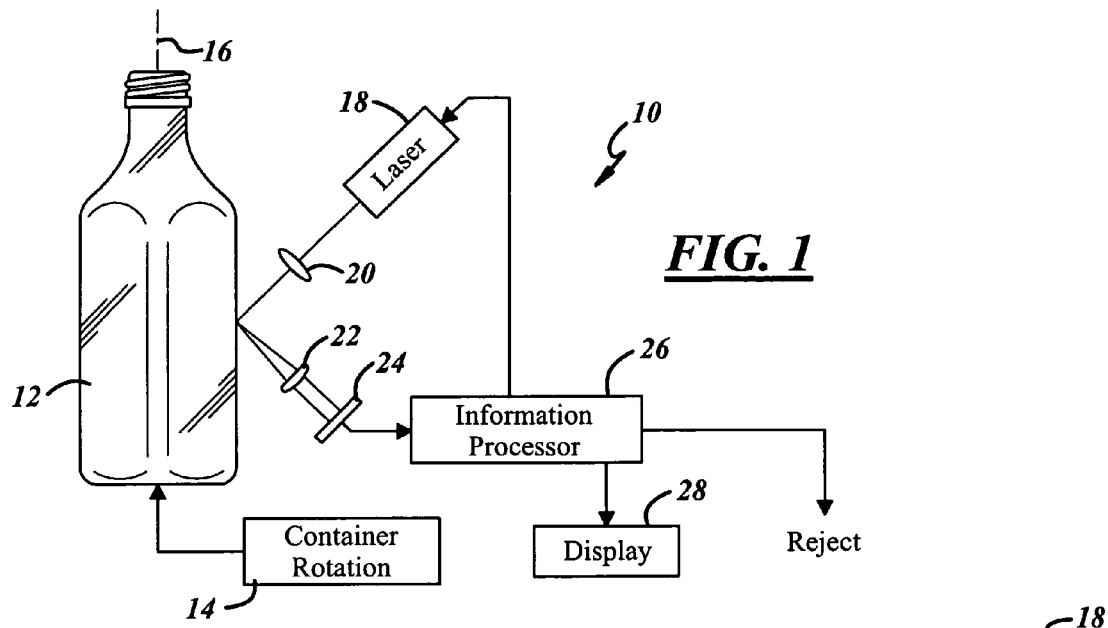
FIG. 1 is a schematic diagram of a container sidewall thickness measurement apparatus in accordance with an exemplary embodiment of the present disclosure.

FIG. 1 is a schematic diagram of an apparatus 10 for inspecting sidewall thickness of a non-round transparent container 12, such as a glass container, in accordance with an exemplary embodiment of the present disclosure. Apparatus 10 includes a conveyor 14 for presenting sequential containers 12, holding each container 12 in turn in stationary position and rotating the container around an axis 16. The axis of rotation of the container preferably is coincident with the central axis of the container, although the axis of rotation may depart from the central axis of the container due to wobble or the like caused by malformation of the container. An exemplary conveyor 14 for presenting sequential non-round containers in turn for inspection, holding the containers in stationary position and rotating the containers around an axis for inspection is illustrated in U.S. Pat. No. 6,557,695. See also U.S. Pat. No. 4,124,112. Other conveyors can be employed.

A light source 18 is disposed to direct light energy through an illumination lens system 20 onto the sidewall of container 12 held and rotated on conveyor 14. Light energy reflected from the inside and outside surfaces of the container sidewall are directed by an anamorphic imaging lens system 22 onto a light sensor 24. An information processor 26 is responsive to sensor 24 for determining sidewall thickness at increments of container rotation as a function of separation at the sensor between light energies reflected from the inside and outside surfaces of the container sidewall. Sidewall thickness information can be presented to an operator at a display 28 and/or can be used by the information processor to activate a reject mechanism associated with the conveyor for separating containers having a sidewall thickness outside of a desired range. Sidewall thickness data can, of course, be stored or otherwise used for production system analysis and control.

Figure 2:
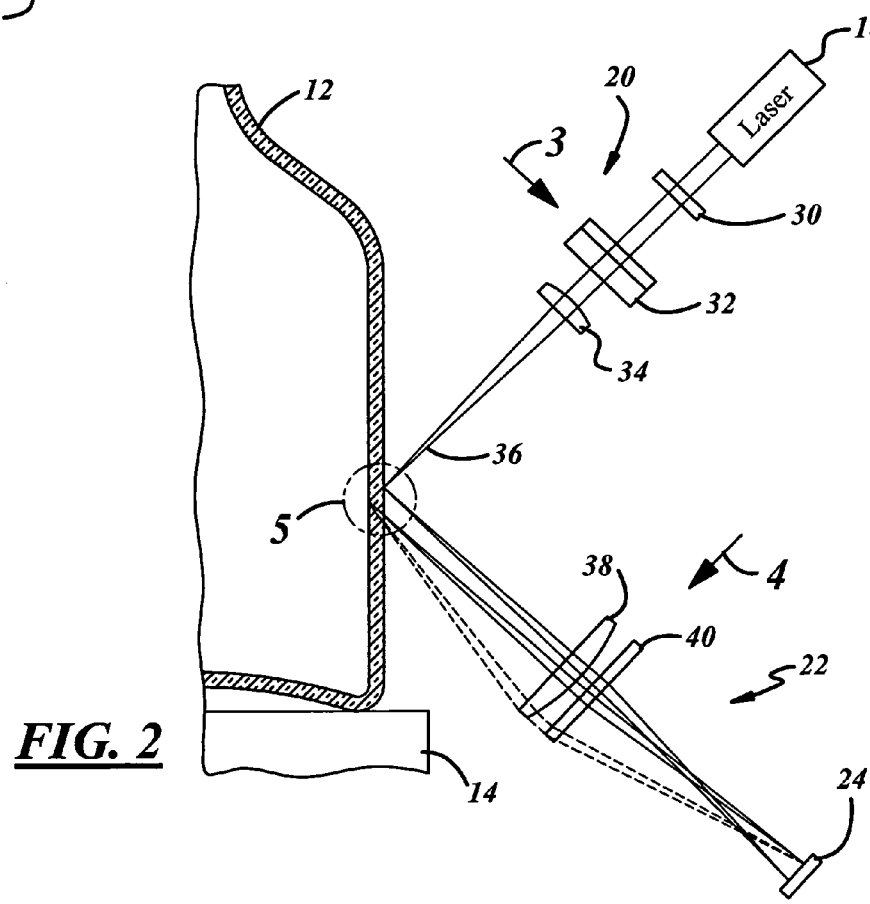
FIG. 2 is a schematic diagram of a portion of the apparatus illustrated in FIG. 1 showing the illumination and imaging lens systems of the exemplary embodiment in greater detail.

FIGS. 2 and 3 illustrate an exemplary embodiment of illumination lens system 20 in greater detail. Light source 18, which preferably is a laser that provides a collimated output beam of small diameter, directs the output beam through illumination lens system 20. The beam is spread into a fan by lens 30 and collimated by lens 32. This beam is converged by lens 34 into a very narrow or line-shaped light beam at the average location of the container side, preferably a position about midway between the sidewall position of FIG. 6A and the sidewall position of FIG. 6F. This line-shaped light beam 36 (FIG. 3) preferably has a long dimension perpendicular to axis 16. The length of line-shaped light beam 36 is coordinated with the dimensions of the container to produce reflections throughout the positions of FIGS. 6A-6K. In the illustrated exemplary embodiment of the disclosure, illumination lens system 20 includes sequential cylinder lenses 30, 32, 34. Other optics can be employed for converting the output of light source 18 into a line-shaped light beam at the container sidewall.

Referring now to FIGS. 2 and 4, imaging lens system 22 is an anamorphic lens system. In the illustrated exemplary embodiment, lens system 22 preferably includes a cylinder lens 38 and a fresnel lens 40. The combination of cylinder lens 38 and fresnel lens 40 has an image plane in which sensor 24 is disposed and an object plane collinear with the long dimension of line-shaped illumination light beam 36 at the outside sidewall surface of container 12. As shown in FIG. 5, illumination beam 36 intersects the outside surface of the sidewall of container 12, with a portion 42 being reflected from the outside sidewall surface and a portion 44 being refracted into the container sidewall, reflected from the inside surface of the container sidewall, and re-emerging from the outside surface of the container sidewall. Anamorphic lens system 22 functions to direct onto sensor 24 light energies 42,44 reflected from portions of the inside and outside surface of the container sidewall that are substantially parallel to the axis 46 (FIG. 4) of anamorphic lens system 22. Stated differently, anamorphic lens system 22 functions to direct onto sensor 24 portions of reflected light energies 42,44 that are reflected in planes substantially perpendicular to lens system axis 46. The terms "substantially parallel" and "substantially perpendicular" refer to portions of the reflecting surface or the reflected light energy that are within the narrow acceptance angle of the anamorphic lens system, such as an angle of 1° in an exemplary embodiment of the disclosure. Reflected light energy 48 (FIG. 4) that is not within this narrow acceptance angle of lens system 22—i.e., is not reflected from a surface portion that is substantially parallel to lens system axis 46 and not reflected in a plane that is substantially perpendicular to axis 46—is directed away from sensor 24. In other words, the reflected light energy must be reflected from surface portions that are substantially perpendicular to the rays of illumination beam 36 as viewed from a direction parallel to axis 16, that is from the direction of FIGS. 3 and 4. Light sensor 24 preferably comprises a linear array light sensor in which the light sensor elements are disposed along a line in a plane that includes container axis of rotation 16. Light sensor 24 alternatively may comprise an area array sensor in which only a portion is used for wall thickness measurement purposes. Anamorphic lens system axis 46 (FIG. 4) preferably is perpendicular to axis of rotation 16 (FIG. 1).

Figure 6A:
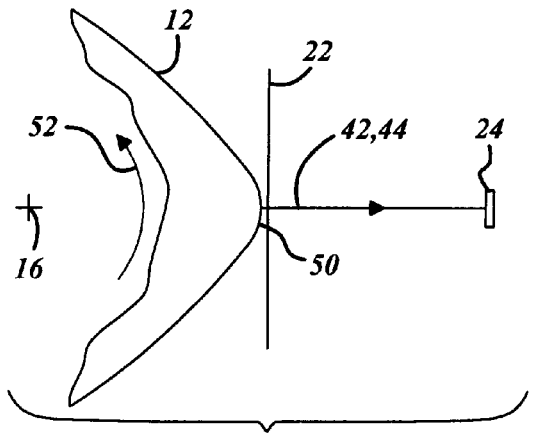
FIGS. 6A-6K are schematic diagrams that illustrate reflections from the container sidewall at successive stages of container rotation.
Figure 6B:
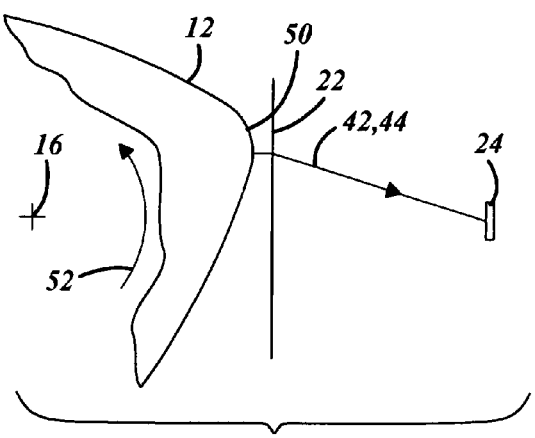
Figure 6C:
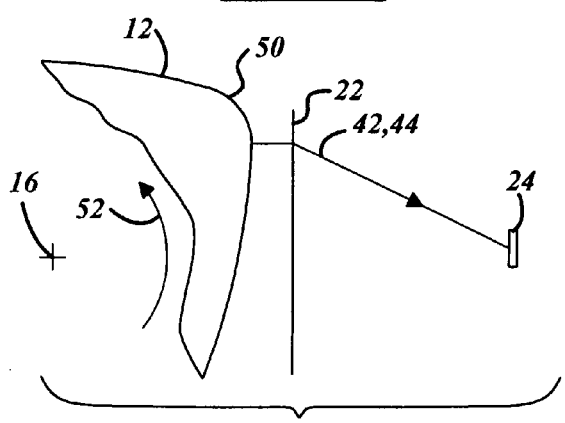
Figure 6D:
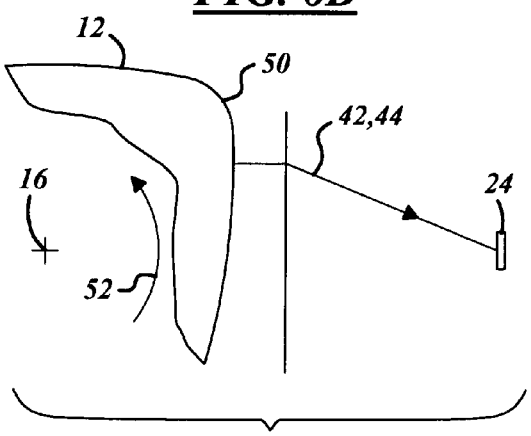
Figure 6E:
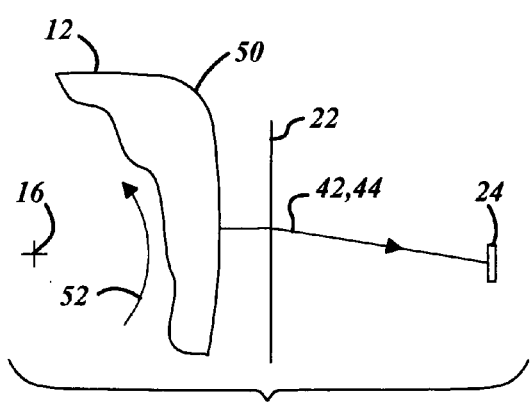
Figure 6F:
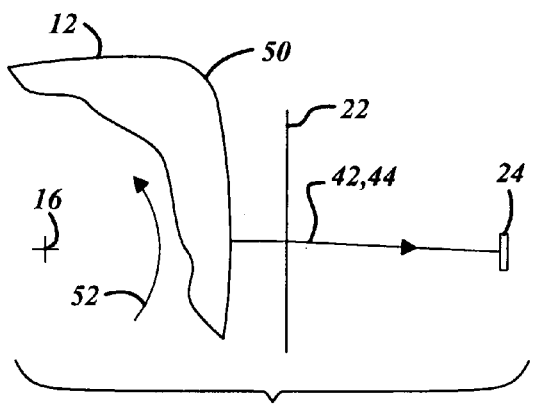
Figure 6G:
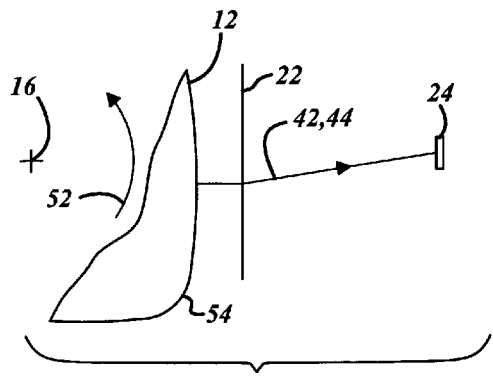
Figure 6H:
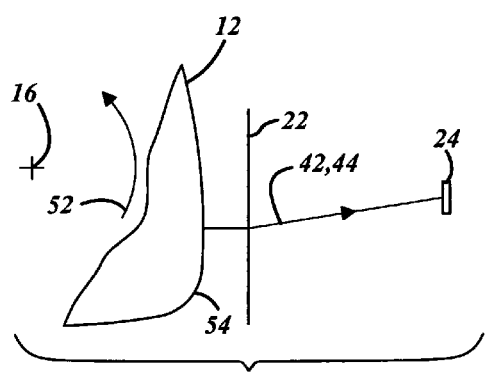
Figure 6I:
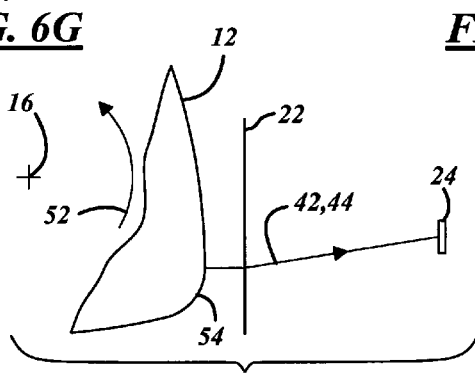
Figure 6J:
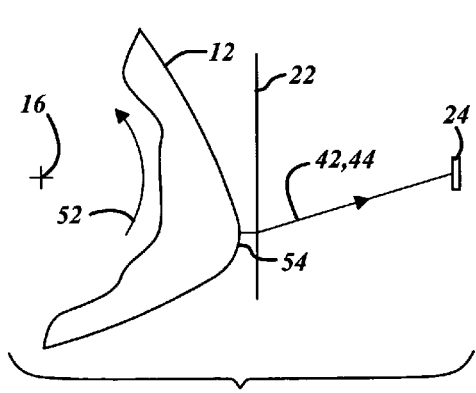
Figure 6K:
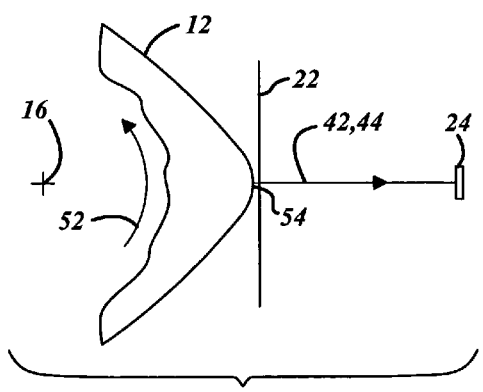

FIGS. 6A-6K illustrate operation of apparatus 10. In FIG. 6A, a first corner 50 of the container sidewall is opposite light sensor 24, so that the inside and outside surfaces at corner 50 are substantially parallel to the axis of imaging anamorphic lens system 22, and portions 42,44 of the light energy reflected from corner 50 are substantially perpendicular to the axis of lens system 22 and are directed onto sensor 24. In FIG. 6B, container 12 has rotated in the direction 52 so that light energies 42,44 reflected from the portions of the container sidewall near corner 50 that are substantially parallel to the axis of lens system 22 have "moved up" lens system 12. In FIGS. 6C-6F, the reflections 42,44 from the portions of the container sidewall that are substantially parallel to the axis of lens system 22 first "move up" the lens system (FIG. 6C) and then "move down" the lens system (FIGS. 6D-6F) until the reflections from the portions of the container sidewall that are substantially parallel to the axis of lens system 22 are about at the midpoint of the container sidewall between corner 50 (FIG. 6F) and the next corner 54 (FIG. 6G) in the direction 52 of container rotation. Between the position of FIG. 6F and the position of FIG. 6I, the reflections 42,44 from the portions of the container sidewall that are substantially parallel to the axis of the imagining lens system "move down" the length of the lens system, which is to say that the reflected light portions 42,44 that are substantially perpendicular to the axis of the lens system "move down" the lens system. From the position of FIG. 6J to the position of FIG. 6K, corner 54 moves to a position opposite lens system 22, so that FIG. 6K is identical to FIG. 6A except that sidewall corner 50 in FIG. 6A is now replaced by the succeeding sidewall corner 54 in FIG. 6K. This process continues from FIG. 6K preferably for at least one full rotation of the container. Thus, light energies 42,44 reflected from the inside and outside surfaces of the container sidewall in planes substantially perpendicular to the lens system axis sweep back and forth along the anamorphic lens system 22 due to non-roundness of the container as is rotates. Information processor 26 scans sensor 24 at increments of container rotation, which may comprise fixed angular increments of container rotation, fixed time increments as the container is rotated at constant velocity and/or varying time increments as the container accelerates or decelerates, and develops a map of container sidewall thickness as a function of angle of rotation of the container.

There thus have been disclosed an apparatus and method for determining sidewall thickness of a transparent non-round container that fully satisfy all of the objects and aims previously set forth. The disclosure has been presented in conjunction with an exemplary embodiment, and a number of modifications and variations have been discussed. Other modifications and variations readily will suggest themselves to persons of ordinary skill in the art in view of the foregoing discussion. For example, although container 12 in the exemplary embodiment of the disclosure has a rounded "square" sidewall geometry, it will be apparent that other non-round container sidewall geometries can be accommodated, including for example triangular geometries, oval geometries, flask-shaped geometries, etc. The disclosure is intended to embrace all such modifications and variations as fall within the spirit and broad scope of the appended claims.

The invention claimed is:

1. Apparatus for inspecting sidewall thickness of a non-round transparent container, which includes:
   a conveyor for holding a container in stationary position and rotating the container around an axis,
   a light source for directing light energy onto a sidewall of a container on said conveyor,
   a light sensor and an anamorphic lens system having a lens system axis for directing onto said light sensor only light energy reflected from portions of the inside and outside surfaces of the container sidewall that are substantially parallel to said lens system axis, and
   an information processor responsive to said sensor for determining sidewall thickness at increments of container rotation as a function of separation at said sensor between light energies reflected from the inside and outside surfaces of the container sidewall.

2. Apparatus for inspecting sidewall thickness of non-round transparent containers, which includes:
   a conveyor for presenting containers in sequence and for holding each container in turn in stationary position while rotating the container around an axis,
   a light source for directing light energy onto a sidewall of a container as the container is held and rotated on said conveyor,
   a light sensor and an anamorphic lens system having a lens system axis for directing onto said light sensor only light energy reflected from inside and outside surface portions of the container sidewall that lie in planes substantially perpendicular to said lens system axis,
   said light energy portions reflected from inside and outside surface portions of the container sidewall that lie in planes substantially perpendicular to the lens system axis sweeping back and forth along said lens system, as the container rotates, due to non-roundness of the container, and
   an information processor responsive to said light sensor for determining sidewall thickness at increments of container rotation as a function of separation at said sensor between light energy portions reflected from the inside and outside surfaces of the container sidewall.

3. A method of inspecting sidewall thickness of a non-round container, which includes the steps of:
   (a) holding the container in stationary position while rotating the container around an axis,
   (b) directing a line-shaped light beam onto a sidewall of the container, said line-shaped light beam having a long dimension perpendicular to said axis,
   (c) directing onto a light sensor only portions of said light beam reflected from inside and outside surfaces of the container sidewall that are substantially perpendicular to light energy directed onto the container sidewall as viewed from a direction parallel to said axis, and
   (d) determining container sidewall thickness at increments of container rotation as a function of separation between light energy portions at said sensor reflected from the inside and outside surfaces of the container sidewall.

\* \* \* \* \*